(12) United States Patent
Wills et al.

(10) Patent No.: US 9,801,325 B2
(45) Date of Patent: Oct. 31, 2017

(54) HUB COVER FOR AGRICULTURE PURPOSES

(71) Applicants: Joel Wills, London (CA); Steve Simon, Rodney (CA)

(72) Inventors: Joel Wills, London (CA); Steve Simon, Rodney (CA)

( * ) Notice: Subject to any disclaimer, the term of this patent is extended or adjusted under 35 U.S.C. 154(b) by 18 days.

(21) Appl. No.: 14/411,774

(22) PCT Filed: Jun. 27, 2013

(86) PCT No.: PCT/CA2013/050504
§ 371 (c)(1),
(2) Date: Dec. 29, 2014

(87) PCT Pub. No.: WO2014/000109
PCT Pub. Date: Jan. 3, 2014

(65) Prior Publication Data
US 2015/0145317 A1    May 28, 2015

Related U.S. Application Data

(60) Provisional application No. 61/665,426, filed on Jun. 28, 2012.

(51) Int. Cl.
*A01B 76/00* (2006.01)
*B60B 7/02* (2006.01)
*B60B 7/06* (2006.01)
*B60B 7/14* (2006.01)
*B60B 7/00* (2006.01)

(52) U.S. Cl.
CPC .............. *A01B 76/00* (2013.01); *B60B 7/002* (2013.01); *B60B 7/0073* (2013.01); *B60B 7/02* (2013.01); *B60B 7/06* (2013.01); *B60B 7/068* (2013.01); *B60B 7/14* (2013.01); *B60B 2360/30* (2013.01); *B60B 2900/3312* (2013.01); *B60Y 2200/22* (2013.01); *Y10T 29/49492* (2015.01)

(58) Field of Classification Search
CPC .......... B60B 7/0068; B60B 7/14; B60B 7/04; B60B 7/00; B60B 3/04; A01B 76/00
See application file for complete search history.

(56) References Cited

U.S. PATENT DOCUMENTS

| | | | | |
|---|---|---|---|---|
| 1,854,728 A | * | 4/1932 | Baker | B60B 3/04 301/11.1 |
| 2,650,135 A | * | 8/1953 | Lyon | B60B 7/04 301/37.105 |
| 2,944,853 A | * | 7/1960 | Lyon | B60B 7/14 301/37.371 |
| 3,356,421 A | | 12/1967 | Trevarrow, Jr. | |

(Continued)

OTHER PUBLICATIONS

International Search Report of PCT/CA2013/050504.

*Primary Examiner* — Hau Phan (57) ABSTRACT

The present invention provides a hub cover for a wheel hub on a vehicle used for agriculture and a stud extension piece used to operatively affix the hub cover to the wheel hub. In a preferred embodiment, the hub cover comprises a polyethylene convex dome that is affixed to the wheel hub of the vehicle using a stud extension piece that couples the hub cover to an exposed wheel hub. The use of the hub cover minimizes crop damage caused by the exposed hubs of the vehicle in crop fields.

9 Claims, 6 Drawing Sheets

(56) References Cited

U.S. PATENT DOCUMENTS

| | | | | |
|---|---|---|---|---|
| 3,726,566 | A | * | 4/1973 | Beith .................. B60B 7/02 |
| | | | | 301/37.108 |
| 4,511,183 | A | * | 4/1985 | Spiegel ................ B60B 7/068 |
| | | | | 301/37.372 |
| 4,530,542 | A | * | 7/1985 | Spiegel ................ B60B 7/00 |
| | | | | 301/37.11 |
| 4,632,465 | A | | 12/1986 | Cummings |
| 4,761,040 | A | | 8/1988 | Johnson |
| 4,842,339 | A | * | 6/1989 | Roulinson ............ B60B 7/068 |
| | | | | 301/108.4 |
| 4,971,396 | A | * | 11/1990 | Morris .................. B60B 7/14 |
| | | | | 301/108.4 |
| 5,222,785 | A | * | 6/1993 | Green .................. B60B 7/14 |
| | | | | 301/108.4 |
| 5,324,099 | A | * | 6/1994 | Fitzhugh .............. B60B 7/068 |
| | | | | 301/108.1 |
| 5,333,785 | A | | 8/1994 | Dodds et al. |
| 6,045,195 | A | * | 4/2000 | Okamoto .............. B60B 7/20 |
| | | | | 301/37.108 |
| 6,485,107 | B2 | * | 11/2002 | Hsu ...................... B60B 7/14 |
| | | | | 301/37.371 |
| 6,595,596 | B1 | * | 7/2003 | Polka .................... B60B 7/02 |
| | | | | 301/37.102 |
| 8,677,623 | B1 | * | 3/2014 | Rayburn .............. B60B 7/068 |
| | | | | 29/894 |
| D744,923 | S | * | 12/2015 | Polka .................... D12/204 |

* cited by examiner

HUB COVER FOR AGRICULTURE PURPOSES

FIELD OF INVENTION

The present invention relates to agricultural equipment. More specifically, the present invention relates to wheel hubs on a vehicle used for agriculture.

BACKGROUND

For some field operations such as spraying, agricultural equipment is required to be driven and towed through crop fields.

Crop damage can occur when this agricultural equipment is driven or towed through the crop fields. The damage can occur from crops becoming caught in or otherwise damaged by the wheel hub of the agricultural equipment. This crop damage reduces the ultimate yield of the crop, thereby reducing the total profits obtained by the farmer. It is therefore important to minimize this damage to maximize crop yield and profits.

While there are techniques and inventions that address the problem of crop damage caused by agricultural equipment, there are certain drawbacks to the prior art that the present invention seeks to overcome.

One such existing technique is to install crop dividers onto the tire or onto the agricultural equipment directly. A crop divider is a V-shaped device that extends in front of the wheel of the agricultural equipment and is used to deflect crops to either side of a line of travel to allow passage along the line of travel while minimizing crop damage. Although crop dividers can help reduce the crop damage caused by the wheels of agricultural equipment pushing crop into the ground, they can be bulky and can cause crop damage when turning. Additionally, plants can become caught in the crop dividers while driving through rows of crop, causing further crop damage. Further, they are expensive pieces of equipment that are labour intensive to install. All of the above factors can result in crop yields and profits that are not maximized to their potentials.

In addition to the damage that can be caused to the crops by the agricultural equipment, the crops can cause damage to the agricultural equipment as it is driven and towed through the crops. For instance, corn stalks can contain tar and other chemicals that may corrode the wheel hubs and the paint on the wheel hubs. Maintenance to remedy this type of damage is expensive for the owner of the equipment.

These limitations and drawbacks of the existing prior art solutions to crop damage caused by agricultural equipment suggest a need for a device that is inexpensive, easy to install, and that will reduce damage caused to and by agricultural equipment and machinery. As such, the present invention seeks to overcome the drawbacks and shortcomings of the prior art.

SUMMARY OF INVENTION

The present invention provides a hub cover that operatively couples to an outwardly exposed area of a wheel hub on a vehicle used for agriculture. The present invention and its various embodiments seek to minimize crop damage caused by agricultural equipment being driven or towed through crop fields. Additionally, the present invention seeks to protect the existing wheel hub on the vehicle from corrosion and other damage caused by the crops coming into contact with the wheel hub.

In a first aspect, the present invention provides a hub cover for a wheel hub on a vehicle used for agriculture, the hub cover comprising: a hub cover for operatively coupling to and covering an outwardly exposed area of the wheel hub on the vehicle; and means for operatively affixing the hub cover to the wheel hub.

In a second aspect, the present invention provides a method of operatively coupling a hub cover to a wheel hub on a vehicle used for agriculture to reduce crop damage, comprising steps of: (a) mounting at least one stud extension piece to at least one stud of the wheel hub; (b) coupling the hub cover to the at least one stud extension piece; and (c) securing the hub cover to the at least one stud extension by using at least one fastening device.

BRIEF DESCRIPTION OF THE DRAWINGS

The embodiments of the present invention will now be described by reference to the following figures, in which identical reference numerals in different figures indicate identical elements and in which.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements cooperate or interact with each other (e.g. as in a cause and effect relationship).

The present invention provides a hub cover and a means for operatively coupling the hub cover to a wheel hub on a vehicle used for agriculture. By covering an exposed wheel hub on the vehicle, the hub cover can reduce crop damage caused by driving or towing agricultural equipment through crop fields.

Figure 1:
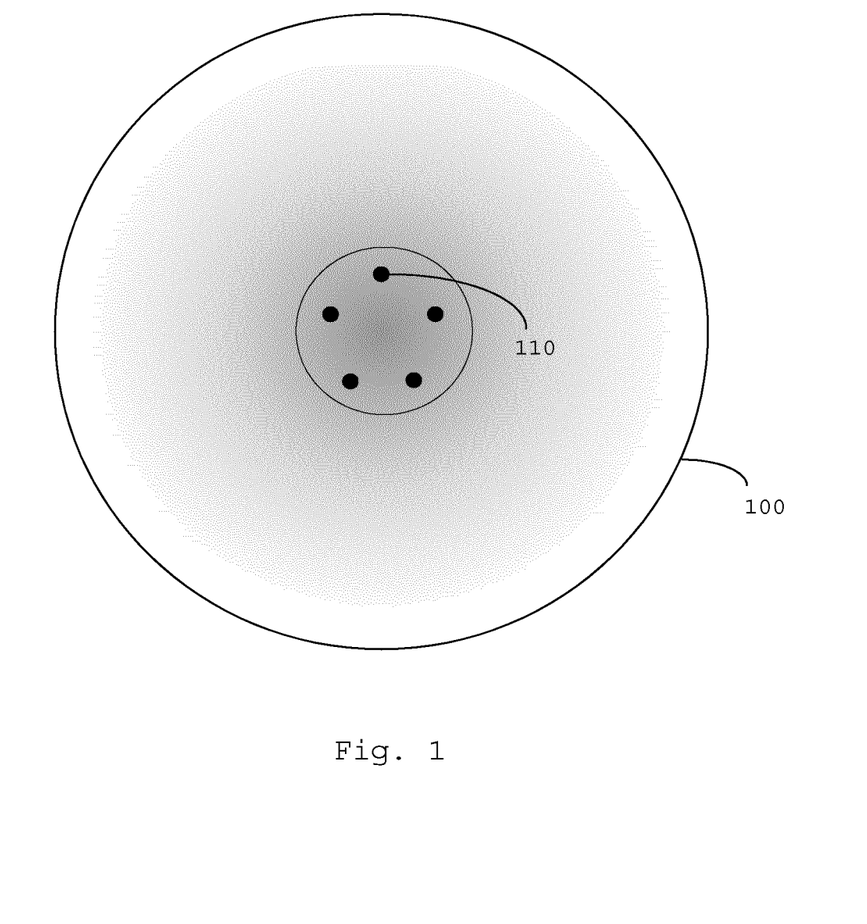
FIG. 1 shows a front view of a hub cover according to one embodiment of the present invention.

FIG. 1 shows an isolated hub cover 100 according to one embodiment of the present invention. At the center of the hub cover are holes 110 designed to align with existing studs of a wheel hub (shown in FIG. 4). These holes enable the hub cover 100 to be operatively coupled to the existing studs of a wheel hub by, according to one embodiment of the present invention, using at least one stud extension piece (shown in FIG. 3).

In one embodiment of the present invention, the hub cover 100 is made of a polyethylene material. Polyethylene material is a plastic that has a high chemical resistance. This makes it resistant to strong acids and bases, and to certain oxidants and reducing agents. This chemical stability assists in preventing corrosion of the dome by the chemicals found in the crops. Additionally, a hub cover made from a polyethylene material will be very easy to clean. The current invention, however, also contemplates hub covers made from other materials known to a person skilled in the art.

Additionally, while the hub cover 100 is shown as being a circular shape, other shapes are contemplated as within the scope of the present invention.

Furthermore, while the hub cover 100 is shown to have 5 holes 110 designed to align with the existing studs of the wheel hub (shown in FIG. 4), variations of the number of holes 110 to be less than or greater than 5 are also contemplated by the present invention.

Figure 2:
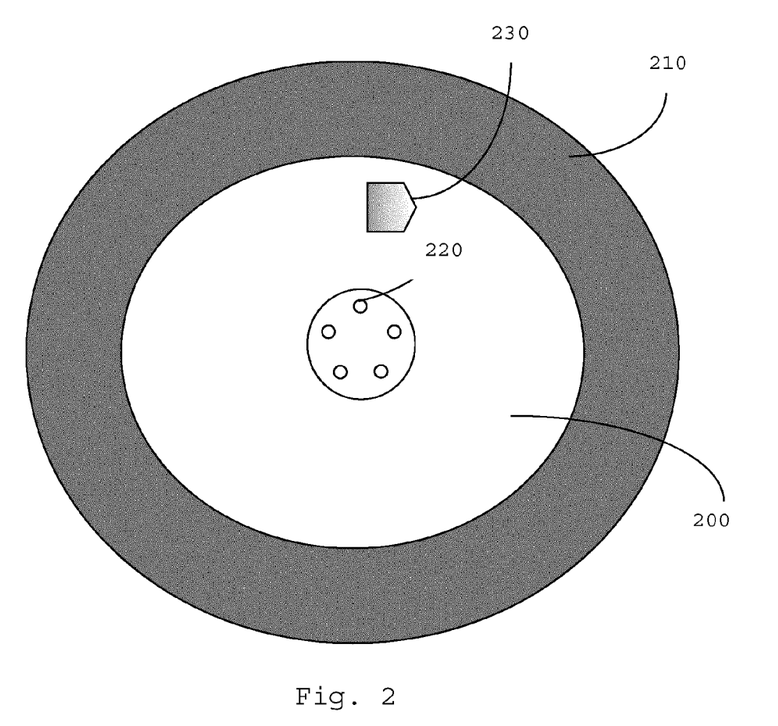
FIG. 2 shows a front view of a circular convex dome hub cover with an air vent, the hub cover being attached to a wheel and covering a wheel hub according to another embodiment of the present invention.

FIG. 2 shows a hub cover 200 as it would appear attached to a wheel 210 of a vehicle used for agriculture. The hub cover 200 is operatively coupled to the wheel hub (shown in FIG. 4) by aligning the holes in the hub cover (shown in FIG. 1) with at least one existing stud of the wheel hub (shown in FIG. 4) and using a means for affixing the hub cover to the wheel hub. According to one embodiment of the present invention, the hub cover 200 is equipped with an air vent 230 to enable air flow through the hub cover 200. Enabling air flow behind the cover may be useful for wheel hub cooling purposes. The hydraulic wheels typically found on agricultural vehicles may create an undesirable amount of heat around the wheel hub. The air vent 230 can keep the temperature at a minimum by enabling airflow through the hub cover 200.

Although FIG. 2 shows a single air vent 230, the present invention contemplates a plurality of air vents in various arrangements and in various shapes and sizes.

In a further embodiment of the present invention, a means for affixing the hub cover 200 to the wheel hub (shown in FIG. 4) may comprise at least one stud extension piece (shown in FIG. 3) and at least one fastening device 220. At least one stud extension piece connects to at least one existing stud of the wheel hub. The hub cover 200 is then affixed to at least one stud extension piece by aligning the holes in the hub cover (shown in FIG. 1) to at least one stud extension piece (shown in FIG. 3) and inserting at least one fastening device 220 through the holes in the hub cover (shown in FIG. 1). At least one fastening device is then connected to at least one stud extension piece.

As previously indicated, coupling the hub cover 200 to the wheel hub of the vehicle (shown in FIG. 4) can minimize crop damage caused by crops becoming caught in or otherwise damaged by the vehicle as it is driven or towed through crop fields. Additionally, it can help minimize damage caused to the wheel hub by the crops and chemicals used on or contained in the crops.

While FIG. 2 shows the hub cover 200 in a circular shape, other shapes are also contemplated by the present invention.

Furthermore, while the hub cover 200 is shown to have 5 fastening devices 220 used to fasten the hub cover 200 to the at least one stud extension piece (shown in FIG. 3), variations of the number of fastening devices 220 to be less or greater than 5 are also contemplated. Further, the present invention contemplates affixing the hub cover to the wheel hub (shown in FIG. 4) by means other than the at least one stud extension piece (shown in FIG. 3) and the at least one fastening device 220.

Figure 3:
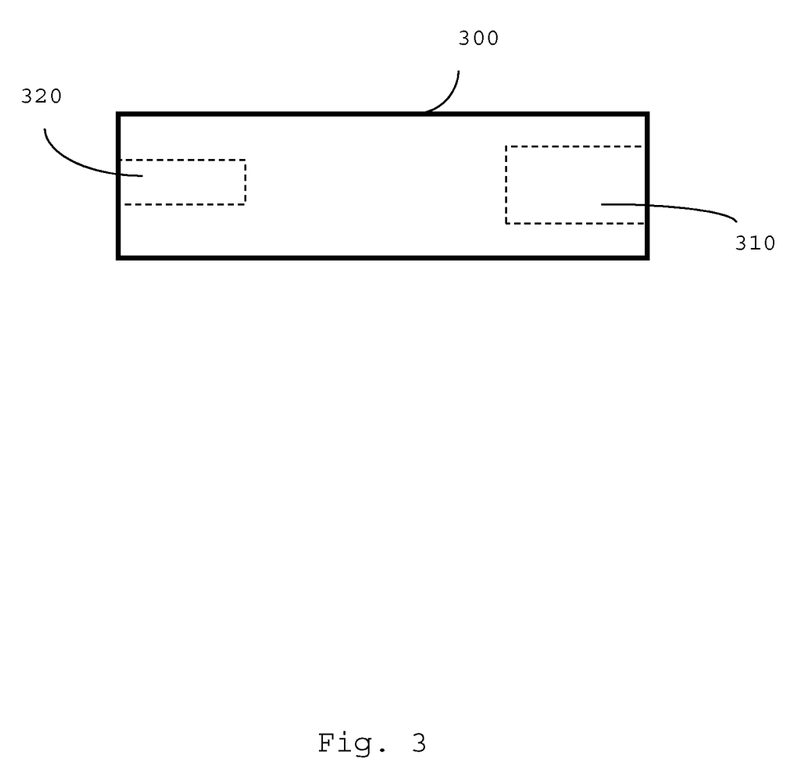
FIG. 3 shows a side view of a stud extension piece according to another embodiment of the present invention.

FIG. 3 shows a side view of a stud extension piece. At least one stud extension piece 300 is used to affix the hub cover (shown in FIG. 1) to the wheel hub (shown in FIG. 4) of a vehicle used for agriculture. One end 310 of the stud extension piece 300 is connected to at least one existing stud of the wheel hub (shown in FIG. 4). The hub cover (shown in FIG. 1) is then operatively coupled to at least one stud extension piece 300 by inserting at least one fastening device (shown in FIG. 4) through at least one hole (shown in FIG. 1) of the hub cover (shown in FIG. 1) and connecting the at least one fastening device (shown in FIG. 4) to the other side 320 of the at least one stud extension piece 300.

Figure 4:
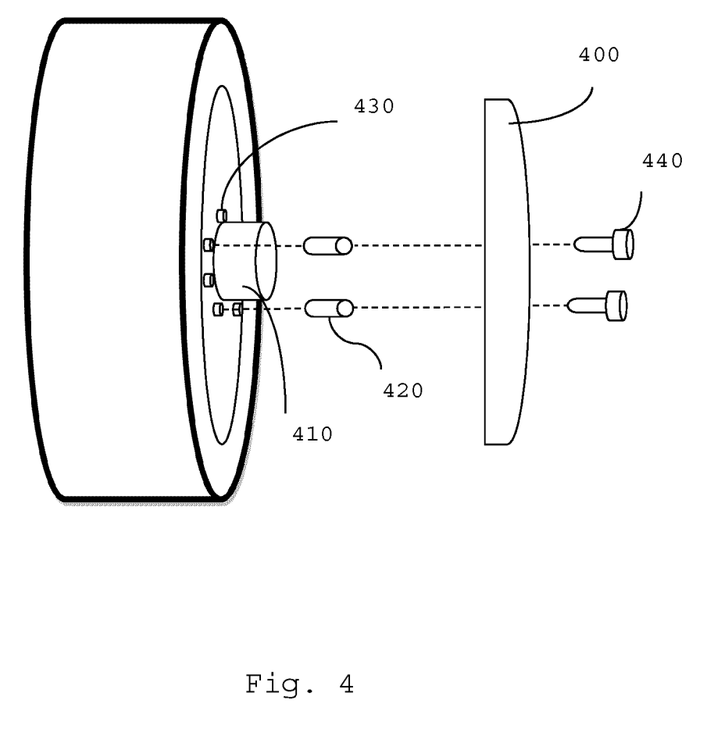
FIG. 4 shows a hub cover coupling with an existing stud of a wheel hub by using stud extension pieces and flathead bolts according to a further embodiment of the present invention.

In one embodiment of the present invention, the ends 310, 320 of the stud extension piece 300 are threaded female openings that are operatively coupled to their male counterparts, the existing studs of the wheel hub and the fastening device (both shown in FIG. 4). Although FIG. 3 shows the right end 310 and the left end 320 of the stud extension piece 300 being different sizes, the present invention contemplates openings that are differently sized or the same size as each other. Additionally, while one embodiment of the present invention is threaded female openings 310 320 the present invention also contemplates other types of openings that could be used in conjunction with non-threaded male fastening devices.

In a further embodiment of the present invention, the hub cover (shown in FIG. 1) is operatively coupled to at least one stud extension piece 300 by using at least one flathead bolt as the at least one fastening device (shown in FIG. 4). The current invention also contemplates using other fastening devices other than flathead bolts to operatively couple the hub cover (shown in FIG. 1) to the at least one stud extension piece 300.

In accordance with another embodiment of the present invention, FIG. 4 shows a hub cover 400 as it would appear being operatively coupled to the outwardly exposed area of the wheel hub 410 of a vehicle used for agriculture. At least one stud extension piece 420 is mounted to at least one stud 430 of the wheel hub. The hub cover 400 is then secured to at least one stud extension piece 420 using a fastening device 440 including, but not limited to, a flathead bolt, a screw, and a nail. At least one fastening device 440 is inserted through a hole (shown in FIG. 1) in the hub cover 400. The fastening device 440 is then connected to the stud extension piece 420.

In accordance with various embodiments of the present invention, the hub cover 400 is operatively coupled to the exposed area of the wheel hub 410 on a vehicle used for agriculture. The vehicles contemplated by the present invention include, but are not limited to, a tractor and a sprayer.

Additionally, the present invention contemplates a plurality of hub covers 400 being operatively affixed to a plurality of wheel hubs on vehicles used for agriculture. This plurality of hub covers includes covering all of the outwardly exposed areas of the wheel hubs on the vehicles and covering all of the outwardly exposed areas of the wheel hubs on one side of the vehicles.

Figure 5:
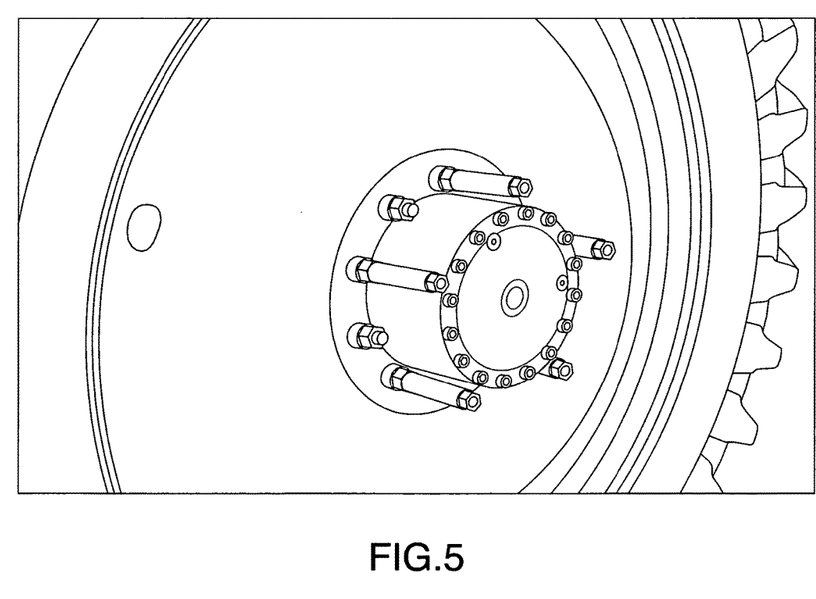
FIG. 5 is a photograph of the stud extension pieces coupled to existing studs of the prior art wheel hub.
Figure 6:
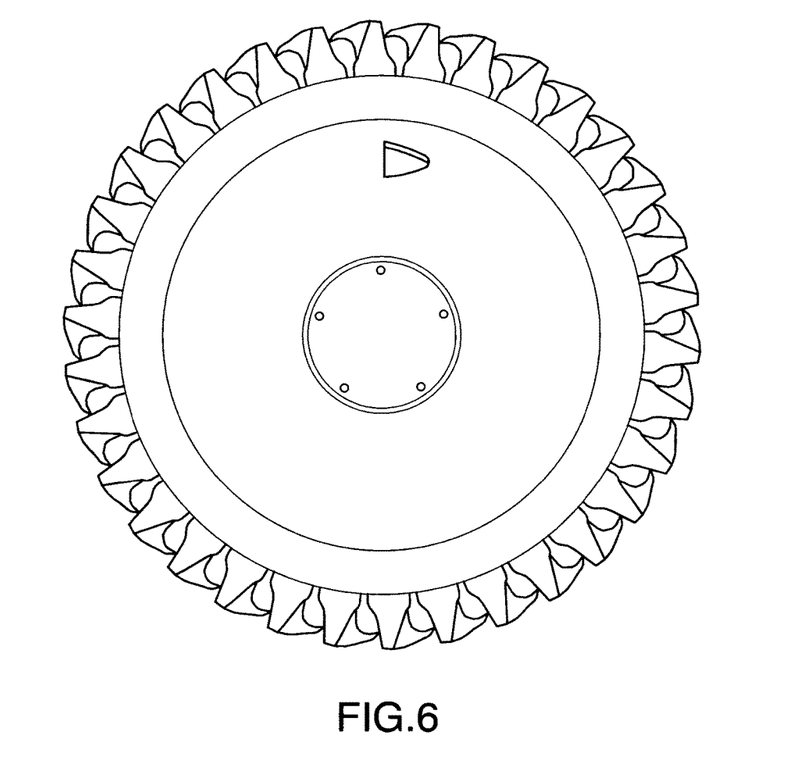
FIG. 6 is a photograph of a hub cover according to another embodiment of the present invention.

For further exemplary purposes, FIG. 5 is a photograph of a wheel hub typical of the prior art. FIG. 6 is a photograph of a hub cover according to another embodiment of the present invention.

A person understanding this invention may now conceive of alternative structures and embodiments or variations of the above all of which are intended to fall within the scope of the invention as defined in the claims that follow.

What is claimed is:

1. A hub cover for a wheel hub on a vehicle used only for agriculture, the hub cover comprising:
   a hub cover for operatively coupling to and covering an outwardly exposed area of the wheel hub, the hub cover having at least one hole, the outwardly exposed area of the wheel hub having at least one existing stud; and
   an attachment for operatively affixing the hub cover to the wheel hub, the attachment including:
      at least one elongated stud extension piece having two ends, where a first end of the at least one stud extension piece is directly coupled to the at least one existing stud of the wheel hub, the at least one stud extension piece directly aligns the at least one hole of the hub cover with one of the at least one existing stud of the wheel hub, and
      at least one fastening device, the at least one fastening device being inserted through the at least one hole of the hub cover and being directly coupled to a second end of the at least one stud extension piece to fully cover the at least one hole,
   wherein the hub cover is for reducing crop damage and wheel hub damage when the wheel hub is in contact with a crop.

2. The hub cover according to claim 1, wherein the hub cover is a convex-shaped dome.

3. The hub cover according to claim 1, wherein the hub cover has at least one air vent to enable air flow through the hub cover.

4. The hub cover according to claim 1, wherein the hub cover is made from a polyethylene material.

5. The hub cover according to claim 1, wherein the at least one hole of the hub cover is located near the center of the hub cover, the at least one hole being designed to align with of the wheel hub.

6. The hub cover according to claim 1, wherein the at least one stud extension piece has at least one side that is a threaded female opening.

7. The hub cover according to claim 1, wherein the at least one fastening device is selected from the group consisting of: a screw, a bolt, and a nail.

8. The hub cover according to claim 1, wherein the hub cover is operatively coupled to the wheel hub of a tractor.

9. The hub cover according to claim 1, wherein the hub cover is operatively coupled to the wheel hub of a sprayer.

* * * * *